US006051059A

United States Patent [19]
Aisner

[11] Patent Number: 6,051,059
[45] Date of Patent: *Apr. 18, 2000

[54] LIQUID ART MEDIUM FOR CREATING THREE-DIMENSIONAL ART

[76] Inventor: Leslie Aisner, 8 Bromfield St., Newburyport, Mass. 01950

[ * ] Notice: This patent is subject to a terminal disclaimer.

[21] Appl. No.: 09/366,140

[22] Filed: Aug. 2, 1999

Related U.S. Application Data

[63] Continuation of application No. 08/967,875, Nov. 12, 1997, Pat. No. 5,931,999, which is a continuation-in-part of application No. 08/727,081, Oct. 8, 1996, abandoned.

[51] Int. Cl.[7] .......... C04B 14/28

[52] U.S. Cl. .......... 106/436; 106/465; 106/779; 106/794; 106/804

[58] Field of Search .......... 106/436, 465, 106/779, 794, 804

[56] References Cited

U.S. PATENT DOCUMENTS

| | | | |
|---|---|---|---|
| 4,076,547 | 2/1978 | Lester et al. . | |
| 4,676,196 | 6/1987 | Lojek et al. . | |
| 4,792,357 | 12/1988 | Bier . | |
| 5,207,830 | 5/1993 | Cowan et al. . | |
| 5,378,279 | 1/1995 | Conroy . | |
| 5,931,999 | 8/1999 | Aisner | 106/436 |

*Primary Examiner*—Paul Marcantoni
*Attorney, Agent, or Firm*—Zarley, McKee, Thomte, Voorhees & Sease

[57] ABSTRACT

A liquid art medium for creating three dimensional art comprises sodium bicarbonate, starch, acrylic polymer emulsion, water, and calcium carbonate. The liquid art medium can be applied to a variety of surfaces for various art projects. Once applied, the medium can be manipulated while still wet and different colors of the medium can be used together without the colors running into each other or bleeding. When dry, the medium can be colored, etched, carved, or sanded to make further artistic effects.

6 Claims, No Drawings

LIQUID ART MEDIUM FOR CREATING THREE-DIMENSIONAL ART

CROSS-REFERENCE TO RELATED APPLICATIONS

This application is a continuation of application Ser. No. 08/967,875 filed Nov. 12, 1997, now U.S. Pat. No. 5,931,999 issued Aug. 3, 1999, which itself is a continuation-in-part of application Ser. No. 08/727,081, filed Oct. 8, 1996, now abandoned.

FIELD OF THE INVENTION

The present invention relates to an artistic medium, and in particular, a medium and method for creating three dimensional art which is especially useful for children.

BACKGROUND OF THE INVENTION

There are currently several liquid art mediums on the market, including three dimensional liquid art mediums. These three dimensional mediums are primarily comprised of an elastic or rubberized material. These materials are non-porous and therefore not accepting of other coloring agents a user may wish to apply. Further, the materials are not easily manipulated once applied due to their consistency. Thus, they are not useful for free-form drawings and designs. In addition, once dry, the prior art materials are "set" and cannot be restored, altered, or carved.

Therefore, a primary objective of the present invention is the provision of a novel liquid art medium for creating three dimensional art, especially for use by children.

Another objective of the present invention is the provision of a liquid art medium for creating three dimensional art which is porous and therefore receptive to the addition of other coloring agents.

Another objective of the present invention is the provision of a liquid art medium for creating three dimensional art which can be easily manipulated when wet.

Another objective of the present invention is the provision of a liquid art medium for creating three dimensional art which can be restored even after the medium has dried.

Another objective of the present invention is the provision of a liquid art medium for creating three dimensional art which can be rethinned even after it is thickened.

Still another objective of the present invention is the provision of a liquid art medium for creating three dimensional art which is carvable.

Yet another objective of the present invention is the provision of a raised liquid art medium for creating three dimensional art which can be made in different colors, wherein the colors can be applied together without bleeding and without the colors running together.

A further objective of the present invention is the provision of a liquid art medium for creating three dimensional art which can be used on a variety of surfaces.

Yet another objective of the present invention is the provision of a liquid art medium for creating three dimensional art which is economical to manufacture and safe to use.

These and other objectives will be apparent from the following description of the invention.

SUMMARY OF THE INVENTION

The liquid art medium of the present invention is comprised of a mixture of sodium bicarbonate, starch, acrylic polymer emulsion, water and, optionally, calcium carbonate. The medium may be colored by the substitution of pigmented calcium carbonate in the mixture. In addition to providing color to the medium, the calcium carbonate adds a thicker consistency to the medium, makes it dry faster, and also gives the medium a "puffier" appearance when dry.

The liquid art medium will bond to any surface which has some degree of rigidity. When applied, the medium will dry exactly as it applied and dries to a matte finish that is very smooth and even. The medium can also be manipulated while wet using various artist's tools to create different designs and textures.

Different colors of the wet medium may be used together without the colors running together or bleeding. Once dry, the color of the medium can be enhanced further using paint, ink, markers, chalk, crayon, etc. Moreover, the dry medium surface can also be sanded, layered, or carved to create additional artistic effects.

Unlike conventional liquid art mediums, such as paints, the present invention can be rethinned even after it is thickened. Further, the present invention is non-toxic, and therefore safe for use by young children. This raised liquid medium lends itself to the creation of virtually unlimited art forms.

DETAILED DESCRIPTION OF THE PREFERRED EMBODIMENT

The liquid art medium of the present invention, which has the tradename Guzali®, is comprised of sodium bicarbonate, starch, acrylic polymer emulsion, water and, optionally, calcium carbonate.

The sodium bicarbonate (baking soda) is the base portion of the liquid art medium and comprises from about 30% to about 60% of the liquid art medium by weight. The preferred amount of sodium bicarbonate is from 35–50%, with about 35–38% being most preferred.

The second ingredient is starch. The starch can be derived from a variety of sources, including corn (maize), arrowroot, potatoes, cassava, and wheat. For the sake of convenience, corn starch is preferred since it is inexpensive and available from most grocery stores. The starch comprises from about 8% to about 17% by weight of the liquid art medium. The preferred range of starch is from about 8–13%, with about 10–11% by weight being most preferred.

Acrylic polymer emulsions are copolymers of one or more alkyl acrylates or methacrylates or mixtures thereof with ethylenically unsaturated monomers containing hydroxy, epoxy, amide, carboxy or isocyanate functionality, such as acrylic or methacrylic acid, acrylamide or methacrylamide or hydroxy-containing monomers such as a hydroxy alkyl acrylate or methacrylate, and allylalcohols. Typical of such acrylic polymers are copolymers and terpolymers containing one or a mixture of $C_1$ to $C_8$ alkyl acrylates or methacrylates such as methyl (meth) acrylate, ethyl (meth) acrylate, butyl (meth) acrylate, ethylhexyl (meth) acrylate and the like with up to about 10 wt. % of a functional acrylic monomer such as (meth) acrylic acid, hydroxyethyl (meth) acrylate or (meth)acrylamide. Acrylic polymer emulsions are commonly used in the manufacture of emulsion paints and all are appropriate for use in the instant invention. They can be purchased from virtually any art, home-improvement, or hardware store.

Common brand names of acrylic polymer emulsions include PBO®, Windsor and Newton®, Deler Roweny®, Rhoplex NT® 2624 available from Rohm & Haas, Philadelphia, Pa.; Conlex V® from Morton International of Chicago, Ill.; ESI-CRYL® 20/20 from Emulsion Systems Inc., Valley Stream, N.Y.; Acusol® 820; EP1®; ACRYL-60® by Thoro Registered TM System Products; UCARLATEX® 173, 174, and 175 by Union Carbide; Hycar® 26171, 26146, and 2600 by B.F. Goodrich, and Liquitex® brand acrylic polymer emulsion by Binney & Smith. Liquitex® is the preferred brand of acrylic polymer emulsion. The acrylic polymer emulsion should be present in an amount of from about 5% to about 32% by weight in the liquid art medium. The preferred range of acrylic polymer emulsion is from about 8–20%, with from about 9–12% being most preferred.

An alternative source of the acrylic polymer emulsion is gesso, which is made from either acrylic polymer emulsion and calcium carbonate or acrylic polymer emulsion and titanium dioxide, depending on the brand. It can be obtained from nearly any types of store which sells art supplies. The "gesso" as used in the present invention is contrasted from the more ancient version of gesso which is an animal skin glue and chalk mixture and can still be purchased in dry powder from art stores. Common brands of gesso include Pearl Brand® which includes both calcium carbonate and titanium dioxide, PBO®, Liquitex®, Windsor & Newton®, Speedball® from Hunt Co., Deler Roweny®, Martin Weber®, Gamblin®, Fredrix®, and Guerra®. The same percentages of acrylic polymer emulsion for use in the instant invention generally apply to the substitution of gesso. The preferred ranges of gesso are from about 20–30% by weight.

The type of water used in the liquid art medium is not critical, however distilled water is preferred. The liquid art medium should contain from about 5–25% by weight water, with 12–20% by weight being preferred, and from about 14–18% being most preferred.

Calcium carbonate (chalk) may also be included in the liquid art medium and serves several purposes, including coloring the liquid art medium, adding a thicker consistency, increasing adherence of the liquid art medium to surfaces, reducing the drying time of the liquid art medium, and for making the liquid art medium retain its volume when it is dry. A preferred brand of calcium carbonate is Johnson® Professional Marking Chalk. Johnson® Professional Marking Chalk is a micro-fine industrial chalk which is preferred since it is non-toxic and therefore safe for small children to use. Other powdered chalks will make a workable product, but if they are not labeled "non-toxic" they may only be appropriate for adult use.

The calcium carbonate used in the liquid art medium may be uncolored or pigmented. Calcium carbonate is commercially sold with the white pigment titanium already included. Preferably, the calcium carbonate used is in its unpigmented form, which is generally only available through the manufacturer. Additional pigment in an amount of from about 1–3% by weight of the calcium carbonate is then added. The colors of the liquid art medium are primary and vivid when the pigment is added separate from the calcium carbonate, in contrast to the earthier tones of the medium which result from the use of pre-colored calcium carbonate. There are hundreds of brands of pigment which are available in most art stores and which may be used in the instant invention. Dry pigment is preferred. Common commercial brands of pigment include Sennelier®, Blokx®, and Gamblin®.

Pigmented chalk may also be used in the liquid art medium. The pigmented chalk typically comprises from about 1–3% by weight pigment. Any color of calcium carbonate may be used in the liquid art medium and a broad range of colors can be created depending on the amount of calcium carbonate added to the base mixture, i.e. from pastels to rich deep color tones. Also, different colors of calcium carbonate can be mixed together to create different color combinations. For example, yellow and blue calcium carbonate can be mixed together to form different shades of green.

The calcium carbonate should be present in a range of from 0% to about 30% by weight of the liquid art medium. The preferred range of calcium carbonate is from about 15–30% by weight and the most preferred range is from about 24–26% by weight. The liquid art medium does not have to include calcium carbonate. However, since the calcium carbonate imparts desired characteristics to the liquid art medium, including the proper consistency, drying time, volume, and increased adherability to surfaces, the proportions of the other dry ingredients are increased to compensate for the missing calcium carbonate.

For instance, if no calcium carbonate is included, the preferred amounts of the remaining ingredients are as follows (all amounts given by weight %): 46–60% sodium bicarbonate, 10–17% starch, 10–30% acrylic polymer emulsion, and 7–16% water. While the liquid art medium can be made without calcium carbonate, the preferred liquid art medium contains calcium carbonate.

Depending upon the type of art project the user is making, more or less water should be added, i.e. the addition of more water makes a thinner liquid art medium. If too much acrylic polymer emulsion or water is added (more than about 23% of each), the finished product sinks (does not retain its volume) and/or gets gummy and cannot be carved.

In contrast, by using a high percentage of the dry ingredients and less acrylic polymer emulsion or water (less than about 12% of each), a more structured formulation can also be made which can be used for molding. This mixture may be rolled into beads or flattened and allowed to dry. The hard finished product is a sculpted entity that stands on its own without adhering to the surface. This product can be further etched, drawn on, or painted. It should be finished with a varnish or medium to add durability.

The surface texture of the liquid art medium can be changed by the addition of materials, including sand, glitter, and other miscible ingredients. It is also contemplated that various other ingredients can be added to the liquid art medium to enhance its elegance, such as brightening agents, glossing agents, fragrance, etc.

In making the liquid art medium, the water is preferably first combined with a small amount of starch to form a gel. The use of the gel has been shown to extend the shelf life of the liquid art medium and, further, improves the consistency of the medium so that it is smoother and easier to pour. The gel also helps to prevent the medium from sticking or clogging in the applicator or nozzle through which the medium is applied. The preferred percentage of starch for this purpose is about 2–3% by weight of the water. This amount of starch is in addition to the standard percentage included in the liquid art medium. The starch is preferably added to boiling water which is then cooled prior to adding the resulting gel to the remaining ingredients. The gel can be added to the other ingredients while it is still hot. However, the resulting liquid art medium is much thicker, flows more slowly, and is more difficult to manipulate. It is believed that this thickening effect is due to the breakdown of the polymers in the starch in the presence of increased heat. For these reasons, it is preferred that the gel be cooled prior to its addition to the other ingredients.

A preferred method for making the liquid art medium is through the use of an electric mixer wherein the medium is mixed until smooth.

The liquid art medium may be applied to a variety of different surfaces, the only requirement being that the surface is semi-rigid to rigid. The surface is also preferably flat. Examples of appropriate surfaces for application of liquid art medium include but are not limited to canvas, mat board, tag board, Plexiglas, masonite, and foam core. The liquid art medium will also adhere to fabric and certain types of more rigid paper, such as construction paper.

The liquid art medium can be applied in any manner, but is best applied using a means for directing it to particular areas. The preferred method is with a nozzle attachment of some type, such as that found on a ketchup bottle. By changing the opening size of the nozzle, the liquid art medium can be applied in thick, fat lines to very thin, precise lines. Drying time will vary accordingly.

The liquid art medium can be layered to create thicker designs. This is done by applying a first layer which is allowed to dry and then applying a subsequent layer. This procedure can be repeated multiple times until the desired thickness is achieved. This layering technique is good for carving projects and can be done quickly if dried in an oven between layers.

Different colors of the liquid art medium can be applied simultaneously without the colors running together and without bleeding. This also allows for the creation of "swirled" designs. When applied, the liquid art medium will puddle on the surface exactly where it is placed and the user may leave it as is or can manipulate the liquid art medium while wet using various artist's tools, including brushes or knifes to create different designs and textures. If spread out while wet, the liquid art medium will have texture and will dry rough. If the liquid art medium is poured out, it will level itself and dry smooth. Wet liquid art medium can also be dented or cut for further effects. The liquid art medium can be easily washed from the surface to which it is applied within 10–15 minutes after applied and washes off hands, clothes, and floors while it is still wet.

The liquid art medium has excellent adhesive qualities and will not peel off. The liquid art medium has some flexibility and, once dry, takes effort to break it up, crack, or peel off the surface which it has been applied to. If the liquid art medium does happen to crack, the cracked spot can be reworked by adding a thin layer of liquid art medium and sanding over the crack.

While most liquid art mediums can be thickened, the instant invention differs from conventional mediums, such as paints, in that it can be thinned to its original consistency simply by adding water.

Upon drying, the liquid art medium maintains the same surface smoothness and volume as it had while wet without contracting or sinking into itself, unlike conventional three dimensional liquid mediums. Air drying time for the liquid art medium will range from about 4–6 hours, depending on a number of factors including humidity, heat, the amount of water used in the liquid art medium, and how thickly the liquid art medium is applied. While air drying is preferred, the liquid art medium may also be dried quickly by placing it in a preheated warm oven for about 10–15 minutes depending on the thickness of the liquid art medium. Upon cooling, the surface will be hard and ready to paint or carve.

Once the liquid art medium is dry, the color of the surface may be enhanced with other coloring agents which can be applied directly to the surface without cracking or indenting the surface of the liquid art medium. For example, the surface can be colored on with crayons, magic markers, ink pens, acrylic and/or oil paint, tempra, or chalk without affecting the shape of the liquid art medium surface. Again, the colors placed on the surface of the dried medium will not bleed or run together but instead forms clean lines, thus allowing for free-form drawings.

Furthermore, the shape of the dry surface of the liquid art medium can be changed by sanding, etching or carving. Areas of the liquid art medium can be reworked while carving etc. by adding a thin layer of new liquid art medium, followed by sanding. Moreover, the dry liquid art medium can be cut with scissors when adhered to paper, mat, or tag board without cracking so long as the liquid art medium is in a thin layer.

Once the liquid art medium has dried and colored or manipulated as desired, a thin coat of protective agent is preferably applied to protect the medium from environmental factors, including dust, dirt fingerprints, and moisture. Such agents are conventionally known in the art and include varnish, matte or gloss mediums.

The liquid art medium may be stored at room temperature or stored in a plastic container or jar in the refrigerator. Steel ball bearings, fungicides, bactericides, and/or preservatives may be incorporated into stored liquid art medium to extend its shelf life. The liquid art medium can also be "revitalized" by adding water and then mixing thoroughly.

The liquid art medium can be used in a variety of artistic projects. For example, the liquid art medium is an excellent medium for creating jewelry. Earrings are made by taking heavy string or leather and dipping them into the liquid art medium batter. The liquid art medium is allowed time to drip and dry and the earrings are then colored or finished with a variety of art products. The earrings should be sealed with polymer medium. The earrings remain slightly flexible and lightweight. Other jewelry items such as beads may be coated in the liquid art medium, decorated, polymer coated, and used for necklaces, bracelets, etc.

For frames, the liquid art medium can be used as an edging on wood, mat board, Plexiglas. It can also be used to restore frames by filling in gaps or restoring broken pieces. On a larger scale, it can be used in architecture in models and landscapes. The liquid art medium mixture may be thickened by adding calcium carbonate or by using less water to create a fine filler that, when dry, may be sanded, filed, scraped, or cut and varnished and/or painted.

The liquid art medium also works well for lettering signs. Signs made with the liquid art medium graphic lettering may be small or large, thick-lined or thin, with or without color and/or combinations of colors to create an attractive and fun way to do logos or signs. In this respect, the liquid art medium is best suited to wood, like masonite, tag or poster board, mat board, plastic board, or Plexiglas and other more rigid surfaces. Signs to be displayed outside must have a finishing, protective coat of varnish or medium covering the liquid art medium.

Thickened liquid art medium acts as a paste and may be used to affix small tile pieces or other adornments on a wall or other vertical surfaces.

For carvings, a thinner mixture of liquid art medium can be poured onto rigid surfaces (i.e. masonite or other such hard surface material) in thin layers until the desired thickness or deepness is reached. It can then be carved, sanded, shaved into scenes, faces, etc. The liquid art medium may also be poured onto the surfaces in a thick layer, depending on the effect the artist is trying to create.

Further, the liquid art medium may be spread out on masonite board or other hard surfaces and used like plaster to cover the surface with a flat or undulated coating. If the liquid art medium is poured out in a higher volume, it will find its own level and dry smooth. The liquid art medium can be sanded down and, when dry, can be painted, inked, or burnished with coloring and engraved or "scratched" with woodcarving tools for fine paintings.

As shown above, the liquid art medium of the instant invention presents an improvement over conventional mediums for the following reasons: 1) it is hard; 2) it accepts various colorings when dry; 3) is flexible; 4) can be carved; 5) flows and puddles without ridges or lines; 6) can be used as a paint to cover or fill in areas with texture; 7) can be rethinned after thickening; and 8) can be restored or reworked. It is also more economical to make than conventional mediums since its ingredients are relatively much less expensive than those present in prior art mediums.

The following examples are intended to further illustrate the invention. They are not intended to limit the invention in any manner.

EXAMPLE 1

Liquid Art Medium Formulation Containing Gesso Using Cool Gel

| Ingredient | Amount (by weight) |
|---|---|
| Sodium Bicarbonate | 510 g (47%) |
| Corn Starch | 137 g (12.7%) |
| White Gesso | 320 g (29.6%) |
| *Gel | 114 g (10.5%) |

*Gel is made by mixing about 19 g of corn starch into 19 g of distilled water and mixing to form a paste. The paste is then dribbled into about 680 g of boiling water and stirred until dissolved and thickened slightly. After cooling, 228 grams of the corn starch/water mixture was combined with the remaining ingredients.

EXAMPLE 2

Liquid Art Medium Formulation Containing Gesso with Cooled Gel and Calcium Carbonate

| Ingredient | Amount (by Weight) |
|---|---|
| Sodium Bicarbonate | 510 g (35.6%) |
| Corn Starch | 137 g (9.6%) |
| White Gesso | 320 g (22.4%) |
| Cool Gel | 226 g (15.8%) |
| Calcium Carbonate | 236 g (16.5%) |

EXAMPLE 3

Liquid Art Medium Formulation Containing Acrylic Polymer Emulsion and Calcium Carbonate

| Ingredient | Amount (by Weight) |
|---|---|
| Sodium Bicarbonate | 37.3% |
| Corn Starch | 10.2% |
| Acrylic Polymer Emulsion | 11.0% |
| Calcium Carbonate | 22.7% |
| Titanium Dioxide | 1.9% |
| Water (cold, distilled) | 16.8% |

An extra 2.7% corn starch is added to the water which is first boiled then cooled. This mixture is then added to the remaining ingredients and mixed.

EXAMPLE 4

Liquid Art Medium Formulation with Acrylic Polymer Emulsion, No Calcium Carbonate

| Ingredient | Amount (By Weight) |
|---|---|
| Sodium Bicarbonate | 55.5% |
| Corn Starch | 15.0% |
| Acrylic Polymer Emulsion | 16.5% |
| Water (preferably with 2.7% corn starch added) | 13.0% |

EXAMPLE 5

Liquid Art Medium Formulation with Calcium Carbonate, Cold Gel

| Ingredient | Amount (By Weight) |
|---|---|
| Sodium Bicarbonate | 37.3% |
| Corn Starch | 10.2% |
| Acrylic Polymer Emulsion | 11.0% |
| Water (preferably with 2.7% corn starch added) | 16.8% |
| Calcium Carbonate (including 1.9% pigment) | 24.6% |

EXAMPLE 6

Liquid Art Medium Formulation Without Calcium Carbonate Hot Gel (Heated to 140° F.)

| Ingredient | Amount (By Weight) |
|---|---|
| Sodium Bicarbonate | 55.6% |
| Corn Starch | 15.0% |
| Acrylic Polymer Emulsion | 16.4% |
| Water (preferably with 2.7% corn starch added) | 12.9% |

EXAMPLE 7

Liquid Art Medium Formulation with Calcium Carbonate Hot Gel (Heated to 140° F.)

| Ingredient | Amount (By Weight) |
|---|---|
| Sodium Bicarbonate | 37.4% |
| Corn Starch | 10.2% |
| Acrylic Polymer Emulsion | 11.1% |
| Water (preferably with 2.7% corn starch added) | 16.8% |
| Calcium Carbonate (including 2.0% pigment) | 24.6% |

EXAMPLE 8

Use of the Liquid Art Medium for Making a "Fresco" Type Painting

The liquid art medium is spread all over a masonite board using a plastering knife. It is then painted with thin washes of watercolor and carved with woodcarving tools or other fine work implements to reveal white engraved lines. The surface is then optionally sanded. The watercolor paint soaks into the liquid art medium as on a Fresco Secco (the old fresco technique of painting on wet plaster).

The surface is sealed with PVA glue diluted in water. The final step is to make the white engraved lines dark by rubbing on a very dark glaze over the whole surface. Once the glaze gathers in the grooves, the whole surface is wiped to take off the excess glaze. The glaze layer gives the surface a satiny feel.

The invention has been shown and described above in connection with the preferred embodiments, and it is understood that many modifications, substitutions, and additions may be made which are within the intended broad scope of the invention. From the foregoing, it can be seen that the present invention accomplishes at least all of the stated objectives.

What is claimed is:

1. A reusable liquid art medium having the characteristics of being nontoxic, when dry, being bondable to substrate materials, porous, carvable, and having about the same volume when wet, and when wet, being smooth and squeezable through an orifice, comprising:

a liquid medium of from about 30 to about 60% sodium bicarbonate, from about 8% to about 17% starch, from about 5% to about 32% acrylic polymer emulsion, from about 5% to about 25% water and from about 0% to about 30% calcium carbonate; and a plastic container therefore.

2. A reusable liquid art medium of claim 1 wherein the liquid art medium is from about 30% to about 60% sodium bicarbonate, from about 8% to about 17% starch, from about 5% to about 32% acrylic polymer emulsion, from about 5% to about 25% water, and from about 15% to about 30% calcium carbonate.

3. The reusable liquid art medium of claim 1 wherein the starch is selected from the group consisting of corn starch, arrowroot starch, potato starch, cassava starch and wheat starch.

4. The reusable liquid art medium of claim 3 wherein the starch is corn starch.

5. The reusable liquid art medium of claim 1 wherein the liquid art medium includes a pigmented chalk at a level of from 1% to 3% by weight.

6. The reusable liquid art medium of claim 1 which contains shelf life extenders selected from the group consisting of fungicides, bactericides, preservatives and emulsion stabilizers.

* * * * *